No. 790,214. PATENTED MAY 16, 1905.
F. M. LOCKE.
METHOD OF MANUFACTURING HIGH POTENTIAL EARTHENWARE INSULATORS.
APPLICATION FILED DEC. 14, 1904.
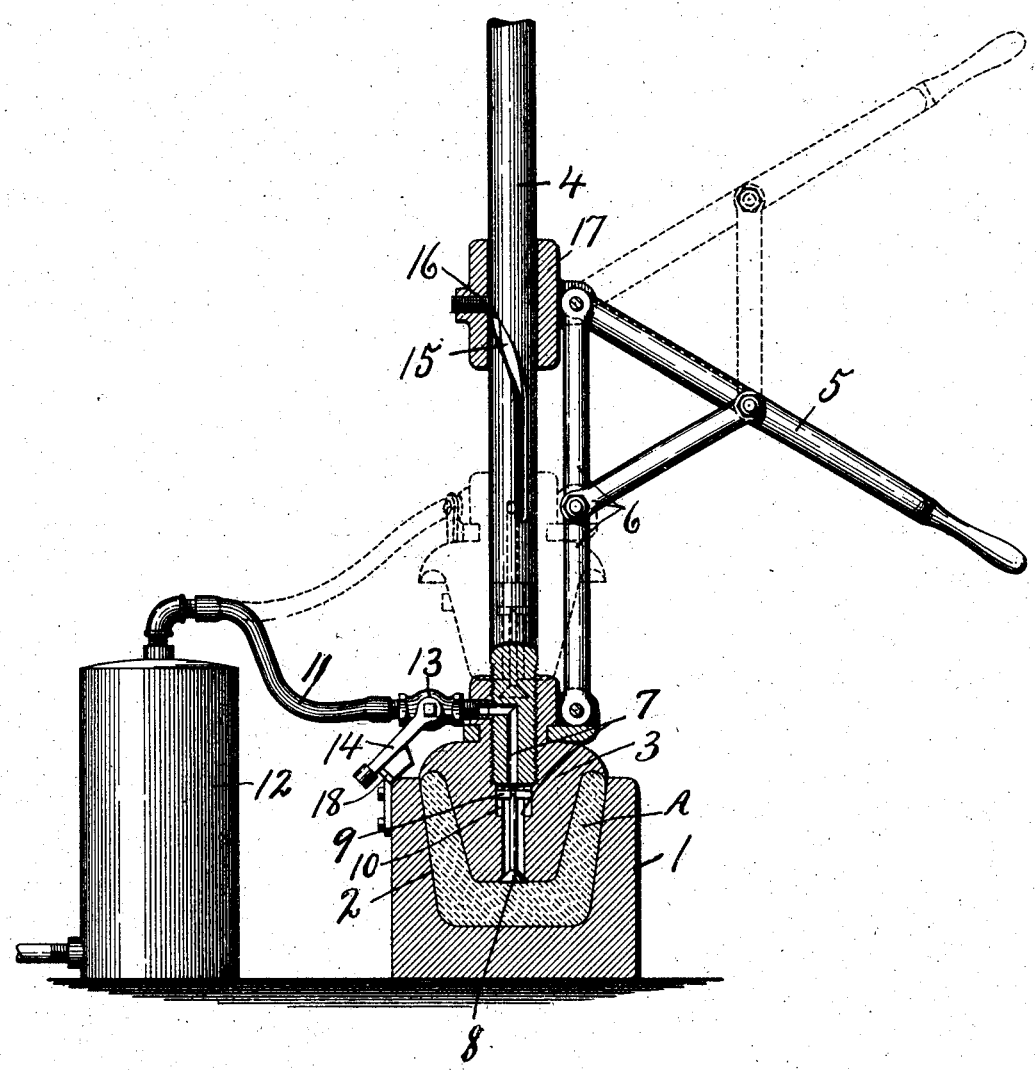
WITNESSES:
B. E. Robinson
H. E. Chase
INVENTOR:
Fred M. Locke
BY:
Howard P. Denison
ATTORNEY.

No. 790,214.                                                          Patented May 16, 1905.

UNITED STATES PATENT OFFICE.

FRED M. LOCKE, OF VICTOR, NEW YORK.

METHOD OF MANUFACTURING HIGH-POTENTIAL EARTHENWARE INSULATORS.

SPECIFICATION forming part of Letters Patent No. 790,214, dated May 16, 1905.

Application filed December 14, 1904. Serial No. 236,894.

*To all whom it may concern:*

Be it known that I, FRED M. LOCKE, of Victor, in the county of Ontario, in the State of New York, have invented new and useful Improvements in Methods of Manufacturing High-Potential Earthenware Insulators, of which the following, taken in connection with the accompanying drawing, is a full, clear, and exact description.

This invention relates to an improved method of manufacturing high-potential earthenware insulators and similar chambered articles under what is now known as the "wet process," by which the material, as clay, is triturated, liquefied, and levigated until practically all of the impurities are expelled and the purified material becomes a plastic, homogeneous, and strongly-cohesive mass, which when molded under pressure and treated in the manner hereinafter described forms a tenacious and highly-impervious body, free from even the smallest air-holes and practically non-puncturable by electric currents of the highest electromotive force.

In my Patent No. 774,765, issued November 15, 1904, I have described and claimed a certain method of making earthenware insulators under a wet process in which the material is subjected to a uniformly and gradually progressive rotary pressure and in which an important step is the introduction of air under atmospheric pressure against the compressed surface at the instant the pressure of the plunger is relieved. The object of this, together with the rotation of the plunger, is to free the plunger and prevent the adhesion of the material thereto and to leave the walls of the chamber as smooth and symmetrical as possible, so as to enable the insulators to fit more closely upon their supports and one within the other when "nested" together. This produces a fairly even but not perfect interior surface, and I have discovered that in practice the plunger actually moves a slight distance out of the plastic body before the air enters and allows more or less of the material to adhere to the plunger when being withdrawn, which causes the interior surface to be more or less rough and uneven. This I have found is due to the fact that the air under normal or atmospheric pressure does not act quick enough nor with sufficient pressure to press the interior surface of the molded plastic body away from the die when it begins to withdraw from the mold, and as this is one of the most important requirements of the formation of a perfectly smooth and even interior surface I have sought to further advance the art by introducing air under a pressure considerably above atmospheric pressure at the instant or slightly before the plunger reaches the limit of its compression or downward stroke and to continue such air-pressure until the plunger has practically freed itself from the plastic body on the upstroke. By so doing I find that I can produce a practically perfect interior surface by a direct reciprocatory action of the plunger without rotation other than a slight rocking movement on its axis when it approaches the limit of its compression-stroke and also when it begins to return.

The primary object of my present invention is therefore to produce a dense, homogeneous earthenware insulator under the wet process by means of uniformly progressive mechanical pressure aided by air-pressure above the normal or atmospheric pressure.

The method of making these high-potential insulators, briefly stated, is as follows: The raw material, such as kaolin or other suitable clay, is triturated, liquefied, and levigated until practically all of the impurities are removed, after which the moisture is practically expelled, leaving a plastic homogeneous and dense mass, which is practically pure and strongly cohesive. The material is now in condition to be formed into insulators, and I have shown in the drawing, an apparatus, partly in elevation and partly in section, for further carrying insulators and similar chambered articles. A quantity of this material sufficient to form an insulator is placed in a suitable flask or receptacle 1, having an interior chamber 2 of such form as to give the desired shape to the exterior of the insulator or other body which is being formed. This means is then subjected to pressure by a suitable die or plunger 3, which is mounted on a vertically-movable shaft 4 and is actuated by a lever 5 and toggle connections 6. The plunger is provided with a lengthwise valve-passage 7, having a vertically-movable valve 8 therein, which closes the lower end of the passage by impact against the material as the plunger descends into such material. The lower face of the valve is preferably coincident with the lower face of the plunger to form a substantially smooth unbroken surface when entering the material, while the upper part of the stem of the valve is formed with shoulders 9, which ride in slots 10 and prevent the withdrawal of the valve from the bottom of the plunger. The passage 8 is connected by a flexible conduit 11 to a reservoir 12, containing compressed air, which may be supplied from any suitable compression-pump not necessary to herein illustrate or describe, as the passage may be connected directly to such a pump, if desired. The conduit 11 is provided with a self-closing valve 13, to the stem of which is attached an arm or lever 14, which in this instance is weighted to close the valve automatically when the plunger leaves the plastic insulator-body. The plunger is rocked slightly on its axis both when approaching the limit of its compression-stroke and also at the beginning of its upstroke, and for this purpose I provide the shaft with a cam or spiral groove 15, which receives a fixed projection or shoulder 16 in a bearing 17 for the shaft 4. The object of this rocking movement at these periods in the downward and upward strokes of the plunger is to enable it to better free itself from the plastic body upon its withdrawal therefrom and also to smooth the interior surface of the insulator and allow the air to distribute itself more uniformly between the die and the walls of the chamber which it has just formed. It is now seen that as the plunger approaches the limit of its downward or compression stroke it is given a slight twisting action as the force of the compression and resistance of the material increases and that this slight twisting action enables the plunger to do its work more effectually and more easily than if it were moved straight into the plastic body without any rocking movement. It is also apparent that this slight twist of the plunger as it leaves the plastic body enables the plunger to be withdrawn more easily and at the same time prevents to a certain extent the adhesion of the plastic material thereto. Just before the plunger reaches the limit of its downward or compression stroke the free or weighted end of the lever 14 engages a fixed shoulder or cam 18, which gradually opens the valve 13 and holds it open while the plunger is effecting its greatest compression on the plastic body and also while the plunger is starting on its upward movement out of such body, but gradually and automatically closes as the plunger continues to rise. This air-pressure being considerably above atmospheric pressure operates to press the plastic material back from the bottom and sides of the die even before the latter starts on its upward movement, so that when the upward movement begins the plunger is practically free from the material and the slight cushion of air surrounding the plunger is evenly distributed by the twisting action of the plunger, and thus renders the interior surface smooth and even.

Although I have shown and described a particular apparatus for forming the insulators, any other mechanism which is capable of raising and lowering a plunger into and out of the plastic body, in combination with any means for introducing air under pressure above atmospheric pressure, will serve to carry out the "forming" steps in the process, and, in fact, I may dispense with the means for producing the twisting or rocking motion of the plunger on its axis, if desired. After the insulator, as A, is thus formed from the plastic material in a cold state it is subjected to the action of air under suitable temperature, after which the green insulator is glazed and finally "fired" and vitrified.

It will now be seen that the various steps in the process, briefly stated, are as follows: first, the raw material is triturated, liquefied, and levigated to remove practically all of the impurities, and the moisture is then sufficiently expelled to form a dense homogeneous and plastic mass free from air-holes; second, a quantity of the plastic mass sufficient to form the insulator is then placed into a suitable flask or receptacle and chambered under a uniformly progressive and twisting pressure while such pressure is being applied and relieved; third, introducing compressed air above atmospheric pressure against the compressed surface of the chamber while the maximum pressure is being applied and relieved, thereby completing the formation, solidifying, and smoothing of the insulator; fourth, partially drying the insulator by air under normal temperature, then glazing the green insulator, and finally firing and vitrifying the glazed insulator.

Although the above process is particularly applicable for making insulators from kaolin by the wet process, it is evident that the same method is equally applicable to the manufacture of glass insulators—that is, the air under pressure is introduced against the walls of the chamber at the period of greatest compression to press the material back and free the plunger before the latter begins to withdraw, the air-pressure serving to produce a smooth interior surface.

Having thus described my invention, what I claim, and desire to secure by Letters Patent, is—

1. The herein-described "wet process" of making insulators consisting in triturating, liquefying and levigating the raw material, such as kaolin, and practically expelling the moisture therefrom to form a dense homogeneous, plastic mass practically free from impurities; then chambering a portion of the plastic mass under a gradually-progressive pressure and introducing compressed air above atmospheric pressure against the compressed surface while the maximum pressure is being applied.

2. The herein-described "wet process" of making high-potential insulators consisting in bringing the raw material to a plastic homogeneous condition, then mechanically shaping the plastic mass under a uniformly and gradually progressive pressure and introducing compressed air above atmospheric pressure against the compressed plastic surface while the maximum mechanical pressure is being applied.

3. The herein-described "wet process" of making high-potential insulators consisting in bringing the raw material to a plastic homogeneous condition, then mechanically shaping the plastic mass under uniformly and gradually progressive pressure and introducing compressed air above atmospheric pressure against the compressed plastic surface while the maximum mechanical pressure is being applied, and afterward glazing and firing the insulator thus formed.

4. The herein-described "wet process" of making high-potential insulators consisting in liquefying and mixing the material to a homogeneous condition, and then expelling sufficient moisture from the mixture to render it plastic, then mechanically shaping the plastic body under a gradually-progressive pressure, and introducing compressed air above atmospheric pressure against the compressed surface while the mechanical pressure is greatest.

5. The herein-described "wet process" of making high-potential insulators consisting in liquefying and mixing the material to a homogeneous condition, and then expelling sufficient moisture from the mixture to render it plastic; then mechanically shaping the plastic body under a gradually-progressive pressure and then introducing compressed air against the compressed surface while the mechanical pressure is greatest; then glazing the green insulator thus formed and firing the same.

6. The herein-described method of making insulators consisting in rendering the insulating material plastic, then subjecting the plastic body to a uniformly-progressive pressure and then introducing air under a pressure greater than atmospheric pressure against the compressed surface of the insulator while the pressure is greatest.

In witness whereof I have hereunto set my hand this 7th day of December, 1904.

FRED M. LOCKE.

Witnesses:
C. A. MOORE,
W. A. HIGINBOTHUM.